Patented Oct. 31, 1950

2,527,533

UNITED STATES PATENT OFFICE 2,527,533

PREPARATION OF ACETALS

John W. Copenhaver, Easton, Pa., assignor to General Aniline & Film Corporation, New York, N. Y., a corporation of Delaware No Drawing. Application December 28, 1946, Serial No. 719,113

15 Claims. (Cl. 260—615)

This invention relates to a method of preparation of acetals, including ketals of oxocarbonylic compounds containing two oxocarbonylic groups, some of which have not been known heretofore and are therefore included in the scope of the present invention as new compounds.

I have discovered that acetals of oxocarbonylic compounds of this type can be prepared by reacting α,β-ethylenically-unsaturated ethers with orthoesters in the presence of an acid-reacting condensing agent as the catalyst, as more fully described below.

The invention is generically applicable to the reaction of open-chain α,β-ethylenically-unsaturated ethers of the formula:

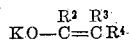

with orthoesters of the general formula:

wherein $R^2$, $R^3$ and $R^4$ stand for hydrogen or an alkyl, aryl or alkaryl group; Q is hydrogen or hydrocarbon, preferably alkyl and more preferably lower alkyl; the K's are radicals of an alcohol or phenol, e. g., aliphatic, aromatic, alicyclic radicals including oxygen or sulfur-interrupted aliphatic hydrocarbon radicals, or two of the K's in the orthoester may together be a bivalent radical of a polyhydric alcohol, in the presence of acid-reacting condensing agents. The course of the reaction is illustrated by the following general equation:

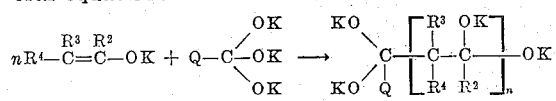

where $n$ is an integer ranging from 1–15 and preferably from 1–5, where the R's, K and Q are defined as indicated above.

While this invention is at present of considerable interest for the production of acetals of 1,3-oxocarbonylic compounds such as malondialdehyde acetals, which are particularly valuable intermediates in the widely-used drug sulfadiazene, by reacting an orthoformic ester with a vinyl ether of the type:

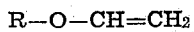

wherein R is an alkyl, aryl or alkaryl group, it will be apparent that by selection of the particular orthoester and α,β-ethylenically-unsaturated ether employed in practicing the present invention, a wide variety of acetals of a large number of other oxocarbonylic compounds containing two oxocarbonylic groups can be prepared, if desired. Thus, in place of the orthoformic esters there may be employed other orthoesters such as the orthoacetates, the orthobutyrates, the orthobenzoates, the orthophenylacetates, etc. with alcohols or phenols such as methyl alcohol, ethyl alcohol, propyl alcohol, the butyl alcohols, cyclohexanol, benzyl alcohol, phenylethyl alcohol, ethylene glycol, propylene glycol, butylene glycol, phenol, the cresols and the like.

Likewise, in the preparation of acetals of oxocarbonylic compounds containing two oxocarbonylic groups, a wide variety of α,β-ethylenically-unsaturated ethers may be employed. As examples of open-chain α,β-ethylenically-unsaturated ethers which may be employed in practicing the present invention, there may be employed the ethyl-, methyl-, propyl-, isopropyl-, isobutyl-, dodecyl-, phenyl-, benzyl-, vinyl-, isopropenyl-, β-methoxyethyl- and β-methylthioethyl-ethers of such α,β-ethylenically-unsaturated alcohols such as vinyl-, isopropenyl-, butenyl-, α-phenylvinyl- and β-phenylvinyl-alcohol and the like.

The catalyst employed in practicing the present invention is, as mentioned, an acid-reacting condensing agent. As examples of suitable catalysts there may be mentioned such acid-reacting condensing agents as boron trifluoride and its complexes with ether, boron trichloride, stannic chloride, titanium chloride, sulfuric acid and the like. The amount of catalyst is not highly critical and may be varied from mere traces to about 0.1 mol of catalyst per mol of orthoester. However, for best results, employing a catalyst like boron trifluoride, amounts within the range of 0.0001 to 0.01 mol of catalyst per mol of orthoester are employed.

It has been found that the reaction is operable through a relatively wide temperature range and no critical limits for temperature have been established. However, while temperatures below 0° C. are operative, no advantage has been found in employing lower temperatures and likewise temperatures above about 50° C. are preferably avoided, since there is no advantage in their use, although the process is operative at temperatures of 100° C. or even higher. When the temperature employed is above the boiling point of any of the reactants, the process can advantageously be carried out under superatmospheric pressure; otherwise, atmospheric pressure may be employed.

The following examples, in which parts are by weight, illustrate the specific embodiments of the invention:

Example 1

To a glass reactor fitted with a stirrer, thermometer, gas inlet tube and condenser was added 636 parts of methyl orthoformate and 2.25 parts of boron trifluoride-diethyl ether complex. To this mixture was added 157 parts of methyl vinyl ether with stirring during the course of 2.75 hours. The temperature of the reaction mixture rose from 25° C. to 41° C. during the first 0.5 hour and was maintained at 40° C. during the remainder of the reaction. The catalyst in the reaction mixture was neutralized by the addition of sodium methylate and the reaction mixture distilled to obtain 376 parts (85% of the theory) of the tetramethyl acetal of malonaldehyde boiling at 66–67° C./12 mm. and having a $N_d^{25}$ of 1.4052. Analysis—calculated for $C_7H_{16}O_4$: C, 51.2; H, 9.82. Found: C, 51.25; H, 10.08. $d_4^{25}$ 0.9885; Md: Calculated: 41.1; found: 40.74.

There was also obtained a small amount of residue which resulted from the reaction of the malonaldehyde acetal with vinyl ether.

Upon heating a mixture of the tetramethyl acetal of malonaldehyde-2,4-dinitrophenyl hydrazine in ethyl alcohol containing a small amount of hydrochloric acid, there was obtained 2,4-dinitrophenyl pyrazole melting at 107–109° C. Analysis—calculated for $C_9H_6N_4O_4$: C, 46.16; H, 2.58; N, 23.93. Found: C, 46.45; H, 2.79; N, 23.69.

Example 2

To an enamel-lined reactor fitted with a condenser, stirrer, thermometer and gas inlet tube was charged 74,000 parts of ethyl orthoformate and 31.25 parts of boron trifluoride-diethyl ether complex. To this mixture was added slowly with stirring 13,000 parts of methyl vinyl ether during a period of six hours while maintaining within the range of 35–40° C. The catalyst was then neutralized by adding sodium methoxide to the reaction mixture. Upon distillation, the following fractions were obtained:

(1) 45,000 parts of methyl triethyl acetal of malonaldehyde boiling at 86° C./6 mm. and having a $N_d^{25}$ of 1.4085. Analysis—calculated for $C_{10}H_{22}O_4$: C, 58.22; H, 10.75. Found: C, 58.05; H, 10.75.

(2) 1480 parts of a pentaalkoxypentane boiling at 126° C./5 mm. and having a $N_d^{25}$ of 1.4202 and which is believed to possess a structure corresponding to 1,1,3-triethoxy-5,5-dimethoxypentane. Analysis—Calculated for $C_{13}H_{28}O_5$: C, 59.06; H, 10.68. Found: C, 59.03; H, 10.71.

(3) 522 parts of a hexaalkoxyheptane boiling at 119° C./0.6 mm. and having a $N_d^{25}$ of 1.4313 and which is believed to possess a structure corresponding to 1,1,3-triethoxy-5,7,7-trimethoxyheptane.

(4) 88 parts of higher boiling products comprising acetals of oxocarbonylic compounds containing 4, 5, 6 and higher units of methyl vinyl ether per unit of ethyl orthoformate.

Example 3

Using a reaction vessel similar to that described in Example 1, 592 parts of ethyl orthoformate and 1 part of boron trifluoride-diethyl ether complex was reacted with 70 parts of divinyl ether, the latter being added slowly during the course of 0.5 hour. The reaction mixture was then heated at 45° C. for 3 hours. To this mixture was added 2.5 parts of diethanolamine to neutralize the catalyst. Upon distillation of the reaction mixture, there was obtained 279 parts of di-(1,3,3-triethoxypropyl)-ether, boiling at 111–114° C./21 mm. and having a $N_d^{25}$ of 1.4088. Analysis—calculated for $C_{18}H_{38}O_7$: C, 58.99; H, 10.45. Found: C, 58.95; H, 10.50.

The reaction of the above product with 2,4-dinitrophenyl hydrazine in ethyl alcohol acidified with hydrochloric acid gave 2,4-dinitrophenyl pyrazole which was identical to that obtained from tetramethyl acetal of malonaldehyde described in Example 1.

Example 4

Using a reaction vessel similar to that described in Example 1, 118 parts of 2-ethoxy-1,3-dioxolane and 0.1 part of boron trifluoride-diethyl ether complex was reacted with 60 parts of methyl vinyl ether, the latter being added slowly during the course of 0.5 hour while maintaining the temperature of the reaction mixture within the range of 25–30° C. The stirring was continued for an additional 0.5 hour and the catalyst was then neutralized by the addition of 0.1 part of diethanolamine. Upon distillation of the reaction mixture, there was obtained 2-(3-methoxy-3-ethoxypropyl)-dioxolane having a boiling point of 95–98° C./15 mm.

Example 5

To a reaction vessel, similar to that described in Example 1, was added 143 parts of methyl orthoacetate and 1.2 parts of stannic chloride. To this mixture was added with stirring 62 parts of methyl vinyl ether while maintaining the temperature at 20–25° C. during a period of 4 hours. The reaction mixture was heated at 40–45° C. for 1 hour and sodium methoxide was then added to neutralize the catalyst. Upon distillation, there was obtained 1,1,3,3-tetramethoxybutane boiling at 73–80° C./24 mm.

I claim:

1. The method of preparing acetals of oxocarbonyl compounds containing two oxocarbonylic groups, which comprises reacting an $\alpha,\beta$-ethylenically-unsaturated ether with an orthoester of the formula:

wherein Q is a member of the group consisting of hydrogen and hydrocarbon radicals and each of the K's is a member of the group consisting of alcohol and phenol radicals, in the presence of an acid-reacting condensing agent.

2. The method of preparing acetals of oxocarbonylic compounds containing two oxocarbonylic groups, which comprises reacting an alkyl ether of an $\alpha,\beta$-ethylenically-unsaturated aliphatic alcohol with an orthoester of the formula:

wherein Q is a member of the group consisting of hydrogen and hydrocarbon radicals and each of the K's is a member of the group consisting of alcohol and phenol radicals, in the presence of an acid-reacting condensing agent.

3. The method of preparing acetals of oxocarbonylic compounds containing two oxocarbonylic groups, which comprises reacting a lower alkyl ether of an $\alpha,\beta$-ethylenically-unsaturated lower aliphatic alcohol with an orthoester of the formula:

wherein Q is a member of the group consisting of hydrogen and hydrocarbon radicals and each of the K's is a member of the group consisting of alcohol and phenol radicals, in the presence of an acid-reacting condensing agent.

4. The method of preparing acetals of 1,3-oxo-carbonylic compounds, which comprises reacting an alkyl vinyl ether with an orthoester of the formula:

wherein Q is a member of the group consisting of hydrogen and hydrocarbon radicals and each of the K's is a member of the group consisting of alcohol and phenol radicals, in the presence of an acid-reacting condensing agent.

5. The method of preparing acetals of 1,3-oxo-carbonylic compounds, which comprises reacting a lower alkyl vinyl ether with an orthoester of the formula:

wherein Q is a member of the group consisting of hydrogen and hydrocarbon radicals and each of the K's is a member of the group consisting of alcohol and phenol radicals, in the presence of an acid-reacting condensing agent.

6. The method of preparing acetals of 1,3-oxo-carbonylic compounds which comprises reacting an $\alpha,\beta$-ethylenically-unsaturated ether with an alkyl orthoester of a fatty acid in the presence of an acid-reacting condensing agent.

7. The method of preparing acetals of 1,3-oxo-carbonylic compounds, which comprises reacting an $\alpha,\beta$-ethylenically-unsaturated ether with an alkyl orthoester of a lower fatty acid in the presence of an acid-reacting condensing agent.

8. The method of preparing acetals of 1,3-oxo-carbonylic compounds, which comprises reacting an $\alpha,\beta$-ethylenically-unsaturated ether with a lower alkyl orthoester of a lower fatty acid in the presence of an acid-reacting condensing agent.

9. The method of preparing acetals of 1,3-oxo-carbonylic compounds, which comprises reacting an alkyl ether of an $\alpha,\beta$-ethylenically-unsaturated aliphatic alcohol with an alkyl orthoester of a fatty acid in the presence of an acid-reacting condensing agent.

10. The method of preparing acetals of 1,3-oxo-carbonylic compounds, which comprises reacting a lower alkyl ether of an $\alpha,\beta$-ethylenically-unsaturated lower aliphatic alcohol with a lower alkyl orthoester of a lower fatty acid in the presence of an acid-reacting condensing agent.

11. The method of preparing acetals of malonaldehyde, which comprises reacting an alkyl vinyl ether with an alkyl orthoformic ester in the presence of an acid-reacting condensing agent.

12. The method of preparing acetals of malonaldehyde, which comprises reacting a lower alkyl vinyl ether with a lower alkyl orthoformic ester in the presence of an acid-reacting condensing agent.

13. As new products, compounds of the general formula:

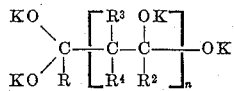

wherein $n$ is an integer from 1 to 15, R stands for a hydrocarbon radical, $R^2$, $R^3$ and $R^4$ stand for a member of the group consisting of hydrogen and alkyl, aryl and alkaryl radicals and the K's stand for a member of the group consisting of alcohol and phenol radicals.

14. As new products, compounds of the general formula:

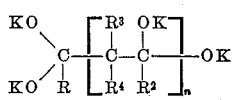

wherein $n$ is an integer from 1 to 15, R stands for a lower alkyl radical, $R^2$, $R^3$ and $R^4$ stand for a member of the group consisting of hydrogen and alkyl, aryl and alkaryl radicals and the K's stand for a member of the group consisting of alcohol and phenol radicals.

15. As new products, compounds of the general formula:

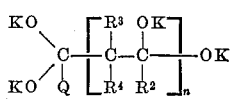

wherein $n$ is an integer from 2 to 15, Q is a member of the group consisting of hydrogen and hydrocarbon radicals, $R^2$, $R^3$ and $R^4$ stand for a member of the group consisting of hydrogen and alkyl, aryl and alkaryl radicals, and the K's stand for a member of the group consisting of alcohol and phenol radicals.

JOHN W. COPENHAVER.

REFERENCES CITED

The following references are of record in the file of this patent:

UNITED STATES PATENTS

| Number | Name | Date |
|---|---|---|
| 2,165,962 | Cunradi et al. | July 11, 1939 |
| 2,194,405 | Purves | Mar. 19, 1940 |
| 2,452,042 | McNamee et al. | Aug. 5, 1947 |

OTHER REFERENCES

Harries: Ber. 34, 1496.
Harries: (B) Ber. 35, 1187.
Whol et al.: Ber. 45, 340.